United States Patent [19]
Culig et al.

[11] Patent Number: 6,129,234
[45] Date of Patent: Oct. 10, 2000

[54] PLATE-SHAPED COVER FOR COOKING VESSELS OR THE LIKE

[75] Inventors: Branko Culig, Marenticeva 6, 8330 Metlika, Slowenien; Cedomir Repac, Brechen, both of Germany

[73] Assignees: Branko Culig, Metlika, Slovenia; Petra Repac, Brechen, Germany

[21] Appl. No.: 09/155,105

[22] PCT Filed: Mar. 6, 1997

[86] PCT No.: PCT/EP97/01131

§ 371 Date: Jan. 11, 1999

§ 102(e) Date: Jan. 11, 1999

[87] PCT Pub. No.: WO97/35504

PCT Pub. Date: Oct. 2, 1997

[30] Foreign Application Priority Data

Mar. 22, 1996 [DE] Germany .......................... 196 11 310

[51] Int. Cl.[7] .............................. A47J 37/10; B65D 51/16
[52] U.S. Cl. .................................. 220/573.1; 220/212.5; 220/254; 220/373; 220/912
[58] Field of Search ..................... 220/913, 912, 220/773, 756, 759, 760, 731, 720, 721, 367.1, 369, 373, 360, 254, 231, 203.29, 201, 203.19, 573.1, 580, 314, 212.5

[56] References Cited

U.S. PATENT DOCUMENTS 2,428,894  10/1947  Serio .
2,536,246  1/1951   Wendt .
4,198,040  4/1980   Colasent ................................. 220/254
4,201,312  5/1980   Basile ..................................... 220/314
4,298,135  11/1981  Vossen .................................... 220/369
4,482,077  11/1984  Henderson ........................... 220/367.1
5,597,088  1/1997   Fingerle et al. ......................... 220/369

FOREIGN PATENT DOCUMENTS 275547    7/1988   European Pat. Off. .
2280347   8/1974   France .................................... 220/369
3311247   10/1984  Germany .
9316720   1/1994   Germany .
29603188  4/1996   Germany .
29605334  5/1996   Germany .
2689      5/1909   United Kingdom .
625312    6/1949   United Kingdom .
2139077   11/1984  United Kingdom ................... 220/369
93-25134  12/1993  WIPO .

*Primary Examiner*—Nathan J. Newhouse
*Attorney, Agent, or Firm*—Liniak, Berenato, Longacre & White

[57] ABSTRACT

The description relates to a plate-shaped cover (1) for cooking vessels or the like which has at least one aperture (12) in a central region (10). A cap (7) covering the at least one aperture (12) in the manner of a roof is secured on the top (14) of the cover (1) by means of a holder (16). The holder (16) takes the form of a handle (2) spanning the cover (1) like a bracket and the end sections (18) of the handle (2) are releasably secured to the edge (20) of the cover.

33 Claims, 11 Drawing Sheets

PLATE-SHAPED COVER FOR COOKING VESSELS OR THE LIKE

BACKGROUND OF THE INVENTION

1. Field of the Invention

The invention relates to a dish-shaped cover cooking/frying vessels and the like, for instance a cooking pot or a frying pan, this cover comprising at least one aperture at its center zone, a hood forming a roof over the at least one aperture being held in place by an affixation means.

2. Description of the Related Art

The German patent document A1 33 11 247 already has disclosed such a cover which comprises a hood allowing completely or also partly sealing the aperture. This hood can be selectively used as a plug-on element and is fitted with a grip in the form of a knob. A special design of rim cams at the hood and projections at the edge of the aperture allows depositing the hood either by the rim cams on the projections, thereby providing venting the cooking/frying vessel during cooking, or depositing the hood rotated by about 45° relative to the former position so it can be fully inserted into the aperture to prevent venting the cooking/frying vessel. This known hood therefore allows sealing the aperture completely or partly. Because the aperture is located in a cover segment lower than the top cover surface, fat or vapors dripping from the hood can return into the cooking/frying vessel. Therefore fat or vapors cannot drip on the outer cover surface and hence cannot drain toward the rim of the cover. As a result soiling the top cover surface by fat sprays from the cooking/frying vessel has already been extensively prevented. On the other hand this known cover entails laborious manufacture because of its complex shape and for the same reason it is cumbersome to clean. Moreover there is some danger of injury due to the rim cams being present at the hood, both when handling the hood and when cleaning it.

Furthermore, a cover for cooking pots and comprising a single cover component with several holes in a middle zone already is known from the European patent document A1 0 275 547. This cover is fitted with a screen upwardly spaced from the holes, thereby allowing free gas exhaustion but extensively preventing ejection of liquids such as splashes of fat and the like through the cover. This cover assumes a dish shape, the middle zone being lower than the remainder of the cover when in use, at least one permanent element supporting the screen. Again this cover entails very laborious manufacture and moreover cleaning can be carried out only after cumbersome disassembly of the screen and of the support. In this disassembly, screws must be loosened, and after the screen has been removed, there is danger from sharp-edged parts when cleaning the cover. Lastly a knob is mounted immediately above the screen and is used as a grip for the cover. On one hand there is danger that the screw connection shall be loosened prematurely when handling the cover and on the other hand the user practically can grab the knob only in a way that the user's hand must pass the hot vapor exit zone.

The German patent document U1 83 34 849 discloses a cover knob with controlled steam exhaust and fitted with a grip connected by a fastener to a latch. An anchor disk is mounted between the grip and the cover. The grip also contains a seat for the fastener. The latch is fitted with a sealing and rest surface supporting the grip, grip and latch being mutually irrotational. The latch comprises one or more radially running channels communicating with one another through apertures in the fastening means. Moreover the latch is mounted in a clearance of the anchor disk tightly enclosing the latch, where the disk is fitted at its periphery with seals closing and opening the channels. Again the manufacture of a cover knob with controlled steam exhaust can be made industrially only laboriously, and cleaning is exceedingly difficult. While the special array of the channels is intended to approximately guide the steam leaving the cooking pot toward the cover surface, burns, for instance on the user's hand, may occur, in particular in case of user carelessness.

Lastly a metal frying pan cover is known from the German patent document U1 89 04 779 which is designed with a central, circular aperture to exhaust steam. A screen curving inward and toward the center of the aperture is mounted above said aperture and projects by its rim a given distance beyond the aperture. The screen is affixed by several narrow supports to the cover. This frying pan is said to offer the advantage that soiling the range, or the cover by splashing oil fat etc. during frying will be widely averted because the splashes of oil, fat etc. reaching the screen will flow back on account of the screen's curvature toward its center and will drip from there through the aperture into the frying pan. Besides the fact that this known frying pan cover cannot retain all fat splashes passing through the aperture, cleaning the cover also is exceedingly cumbersome and time consuming. In particular the underside of the screen or shield is hard to reach, and because of the array of small brackets between screen and cover, danger of injury, especially when cleaning the cover, cannot be ruled out.

SUMMARY OF THE INVENTION

In the light of this state of the art, it is the objective of the present invention to create a more easily handled cover. In particular the cover must be easily and reliably removable/reassemblable from and to the cooking/frying vessel when in use. In a subordinate feature of the invention, easy and safe cleaning of the cover is made possible.

This problem is solved for a cover of the invention of the initially cited kind essentially in that the affixation means is a grip in the shape of a bail spanning the cover and in that the terminal grip zones are detachably affixed to the cover rim. Because the affixation means spans the cover as whole and essentially diametrically, the user is able to seize the cover to remove it or put it back also in those zones where hot steam or the like is not expected to issue. Danger of burns is widely minimized as a result.

In a first further development of the invention, it is very easy to detach the grip designed as an affixation means from the cover for purposes of cleaning, and accordingly simple and quick cleaning both of the cover and the sealing element are assured.

Moreover the cover of the invention is free of parts with sharp edges and thereby danger of injury during cleaning is practically eliminated.

In another advantageous embodiment of the invention, the rim of the cover consists of an upwardly bent annular wall fitted with outwardly pointing catches, brackets, cams or the like. The annular wall along the periphery of the cover reliably prevents draining fat, vapors etc. that issued to the outside through the cover aperture from draining. Also the annular wall provides the basis for the grip being deposited in simple and reliable manner on the rim of the cover. The radially outward catches at the cover rim are used to affix the grip to the cover.

To allow easily depositing and refastening the grip previously detached from the cover, the terminal segments of the grip are fitted in another embodiment of the invention with a groove—or channel-shaped seat to receive the annular wall.

The terminal segments of the grip comprise at the underside an essentially U-shaped, hooked or similarly shaped inward crimp to affix the grip to the cover, this crimp passing underneath, i.e. enclosing the catch of the annular wall.

In order to position the grip on the cover in a defined affixation position, a crimp at a first side rim of the grip is fitted with a stop, in particular a crosswall or the like. The terminal grip segments therefore comprise pouch-like seats which, in the fastening position, seize around the cover catches. In order to set up this connection, the grip is deposited on the cover, the groove- or channel-shaped seats of the terminal grip segments are seated laterally of the catches on the upward-bent annular cover wall. After a slight rotation of the full grip on the cover, the catches are inserted into the pouch-like seats in the terminal grip segments and thereby a geometrically interlocking connection is set up between the grip and the cover.

To reliable avoid that the grip become separated from the cover when in use, a latch, a slider or the like rests in pivoting, tipping or similar manner on at least one of the terminal grip segments to secure the grip against being accidentally detached from the cover.

For that purpose the latch is advantageously mounted in the zone of a second grip-side rim and comprises a stop, in particular a tab, a catch, bracket or the like which in the locked position rests laterally of the cover catch. These steps close the unilaterally open pouch receiving the cover catch when the latch is in the looked position, and thereby accidental detachment of the grip from the cover is precluded.

In another advantageous feature of the invention, the latch is supported in pivoting, tipping or similar manner, in particular by a bolt or the like, in the zone of the terminal grip segment, this bolt being in particular mounted transversely to the length of the grip. This step is characterized by an exceedingly simple design and hence also economical manufacture.

An especially advantageous step is that the latch when in the closed position is substantially fully received in a matching clearance of the terminal segment. This feature eliminates sharp-edged corners, edges and the like, the latch in its locked position being completely received into the terminal grip segments, ic being received in their clearances.

To avoid accidentally removing the latch from the closed position, this latch can be detented by a detent catch, detent pin or a similar elastic element into the grip terminal segment.

In another advantageous embodiment, the top side of the cover is substantially concave. Thereby splashes of fat or oil and vapors escaping through the aperture can flow back along the concave surface through the aperture into the frying vessel.

In another especially advantageous embodiment of the invention the cover is made of glass, ceramic, plastic and/or metal or the like, where called for the cover's underside being roughened by sand jets, printing, knurling or decoration. On one hand this step allows observing food in the cooking/frying vessel or the like even though the cover has been deposited. On the other hand roughening the cover underside improves slip resistance when the cover is laid on the food vessel. There is no need to fear that the cover might accidentally slip from the cooking vessel.

In a further advantageous embodiment of the invention, the grip comprises a middle part to mount or fasten the hood, two and where appropriate three or more arms running toward the cover rim. In this manner an especially dimensionally stable grip is achieved that can be fastened in simple and reliable manner to the cover.

In the most economical case, the arms of the grip run diametrically outward and as a result the grip spans the cover along a diameter in the manner of a bail or bridge. Especially as regards large covers, it may be appropriate however to make use of three, four or more grip arms which will converge toward the center and preferably will subtend equal angles between adjacent arms. In the design of a three-arm grip, adjacent arms preferably are spaced apart by 120° and four arms are preferably spaced apart by 90°.

In an exceedingly advantageous and in particular independent embodiment of the invention, the grip is fitted with an adjustment means to preferably continuously lower/raise the seal relative to the cover. It is possible thereby to completely seal off, or open more or less, the cover aperture depending on the particular cooking needs. Illustratively it is possible at the beginning of cooking to open the aperture in order to let out more liquid issuing from the food being cooked in the initial phase whereas for instance at the end of cooking the aperture may be sealed off completely or in any event partly. Obviously different periods of opening/sealing the aperture also are feasible and are left to the judgment of the particular user.

In an especially simple design, the grip lowering/raising the hood comprises a borehole with an inside thread at the hood's center zone, the hood being affixed to a setting device rotatably guided in said borehole.

In another embodiment of the invention the setting device is pot-shaped or comprises a central borehole, where appropriate the rim of the setting device being fitted with crossbars or the like in order to allow the user to easily rotate the adjustment means when oil or fat splashes are present on it.

In further advantageous manner, a thermometer is mounted in a recess or borehole of the adjustment means to display the cooking temperature in the cooking/frying vessel fitted with the cover.

In another advantageous embodiment of the invention, the setting device and the hood are connected to each other by a detachable fastener, in particular a screw, a bolt or the like.

The fastener consists of a heat-conducting material such as iron, aluminum or the like and is connected to the thermometer in thermally conducting manner. The fastener on one hand passing through the hood and on the other hand being connected in thermally conducting manner to the thermometer, the temperature in the cooking/frying vessel is accurately known. Even if the hood is lifted and hence the cover aperture is open, one end of the fastener is directly above the food being cooked and is heated by radiation or the rising steam to the temperature in the cooking/frying vessel proper, and even in such a case the temperature is displayed accurately.

In a simple design, the hood is substantially in the form of a disk or the like. Accordingly the disk can be manufactured economically, the outer hood rim, which points upward or downward, illustratively being beaded, for instance by flanging or the like. Equally feasible, the outer rim may be molded with plastic into a bead.

In another advantageous embodiment of the invention, the hood surface is convex, and thereby steam or the like exiting the aperture is deflected radially outward in the direction of the cover surface, and as a result of the steam spreading over a surface and its mixing with the ambient air, the danger of combustion is practically eliminated. Moreover such a convex shape assures, when the hood has been lowered, a well-sealing application of the hood rim against the surface of the cover.

In especially advantageous manner, at least the outer rim zone of the hood shall be resilient or made of a resilient material to further improve sealing.

The hood comprises a central and substantially circular protrusion entering a seat of the setting device to assure reliable seating. As a result the setting device is secured in geometrically interlocking manner concerning the positioning relative to the setting device, the fastener then merely being used to fasten the hood to the setting device.

A thermostat or the like is present in another advantageous embodiment of the invention and is designed to automatically raise/lower the hood relative to the aperture as a function of temperature. This feature assures that the hood automatically is self-positioning relative to the cover aperture as a function of the temperature in the frying vessel. Therefore the thermostat can be appropriately designed that temperatures close the hood the aperture, whereas at temperatures in the frying pan above a nominal value or a nominal range of values the thermostat automatically lifts the hood from the aperture.

To improve seating the cover on the cooking/frying vessel and to prevent the cover from accidentally slipping off it, another preferred embodiment of the invention provides one or more concentric annular beads or annular bead segments or the like at a preferably outer rim zone at the underside of the cover in mounted or integrated form. The positioning of these retainers, preventing cover slippage on the cover underside, is selected in such manner that the cover is securely deposited on different frying vessels of standard sizes.

In a further and alternative embodiment of the invention, the seating of the cover on the frying vessel can be further improved by mounting or integrating several annularly disposed steps, offsets or the like on or into the cover's underside.

In an especially advantageous embodiment of the invention, the cover is composed of a glass base with a central aperture and the grip is made of sheetmetal or the like, terminal segments of the grip being crimped around the cover rim. This embodiment being free of cams or the like at the cover rim, the glass cover can be manufactured in exceedingly economical manner.

In another embodiment of the invention the cover consists of a glass base with a central aperture, the glass base being enclosed at its circumference by an outer ring made of sheetmetal or the like and the grip being integral with the outer ring. In particular the outer ring may comprise a rim or the like drawn upwards. This feature represents manufacturing savings as regards the cover because the glass base then need not have its own upwardly drawn rim. The integral connection, ie nature of grip and sheetmetal further saves on manufacturing costs in this embodiment of the invention. The outer ring, and thus the grip, can be reliably and permanently affixed to the glass base in that this glass base is fitted at its rim zone with a preferably sheetmetal annular shoe or similar shaped-section, where called for with an adapted strip, such cross-sectionally shaped sheetmetal being connected by a fastener means such as a screw, rivet, adhesive or solder or the like to the grip, ic to the outer ring.

Advantageously the grip comprises four substantially mutually orthogonal arms running radially from a middle zone outward to the rim of the cover and preferably being crimped at their ends around the cover. An especially well affixed grip is secured in this manner.

In an especially advantageous, independent embodiment of the invention, the grip comprises two adjacent bails radially spanning the cover.

Advantageously, the terminal segments of the adjacent bails each are held in a support and grip the cover in the manner of a U-channel and are affixed in clamping, detenting or similar manner to the cover.

The hood can be actuated in especially simple manner by the feature of a slider being displaceably guided on each bail, a linkage to raise/lower the hood being mounted between the sliders and the hood.

This linkage offers the advantage of having on articulating arm in each case, which is connected to the slider and to a bearing of the hood.

To preclude accidentally displacing the slider and thereby the hood position, the sliders advantageously are affixable in clamping, detenting or similar manner against the bails.

Further objectives, advantages and features and applications of the present invention are elucidated in the following description of the illustrative embodiments shown in the drawings. All features that are described and/or shown graphically constitute the objective of the present invention, whether per se or in arbitrary, meaningful combination(s), also regardless of their summarization in the claims or interrelation of claims.

DETAILED DESCRIPTION OF THE PREFERRED EMBODIMENT

Figure 1:
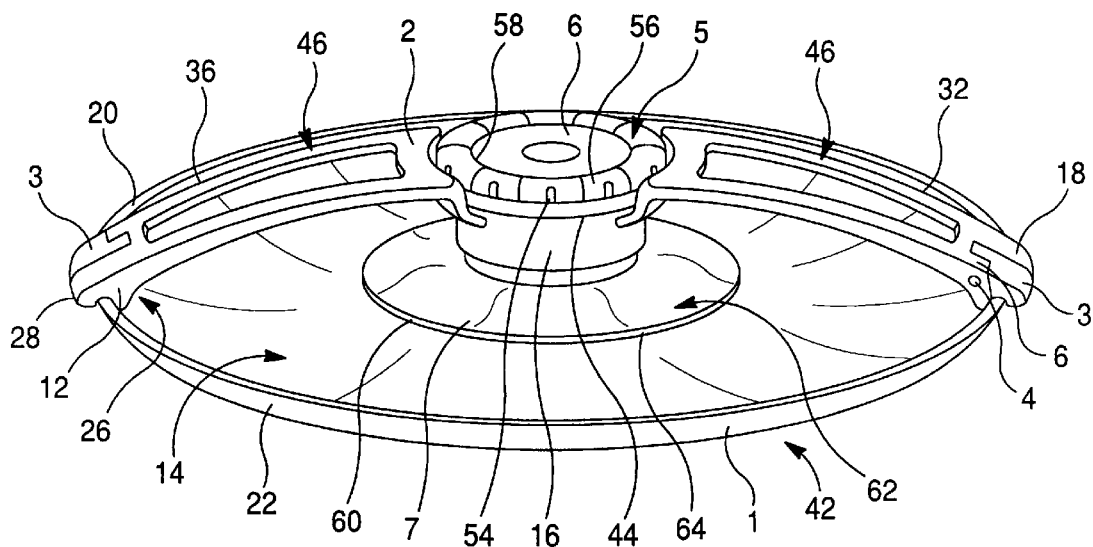
FIG. 1 is an isometric view of an illustrative embodiment of the cover of the invention with the latch in the closed position.
Figure 2:
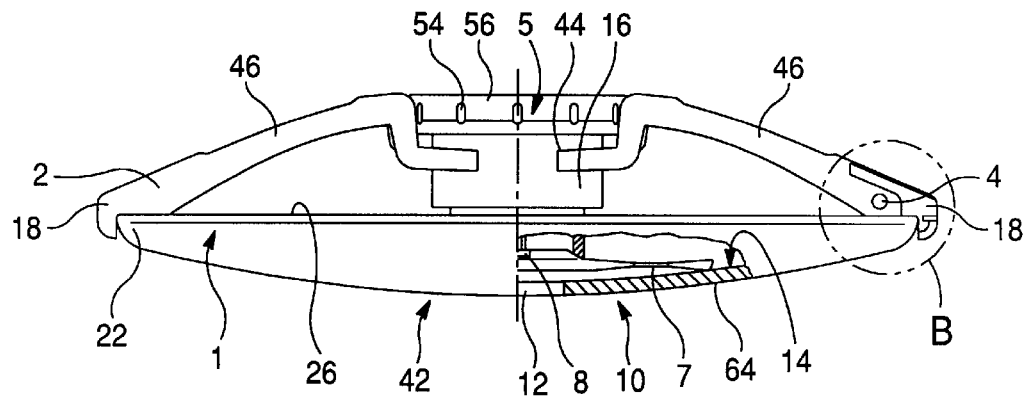
FIG. 2 is a partly sectional sideview of the cover of FIG. 1.
Figure 3:
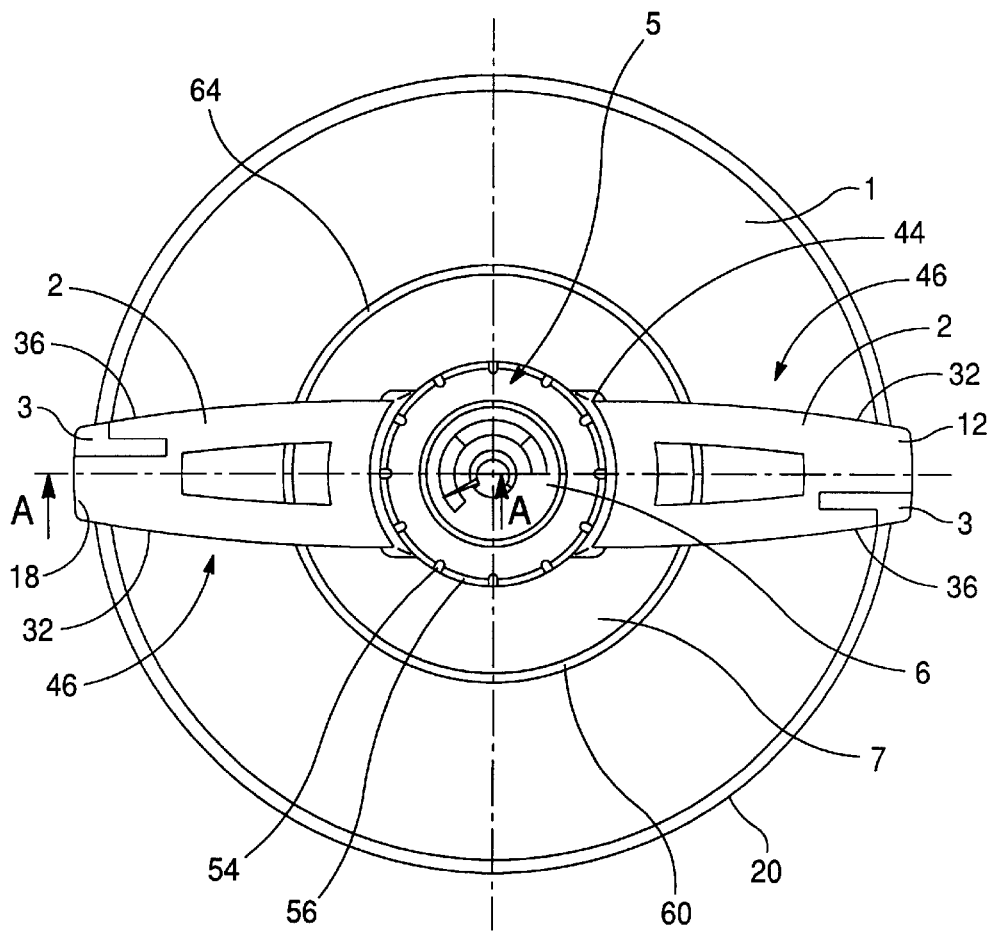
FIG. 3 is a topview of the cover of FIG. 1.
Figure 4:
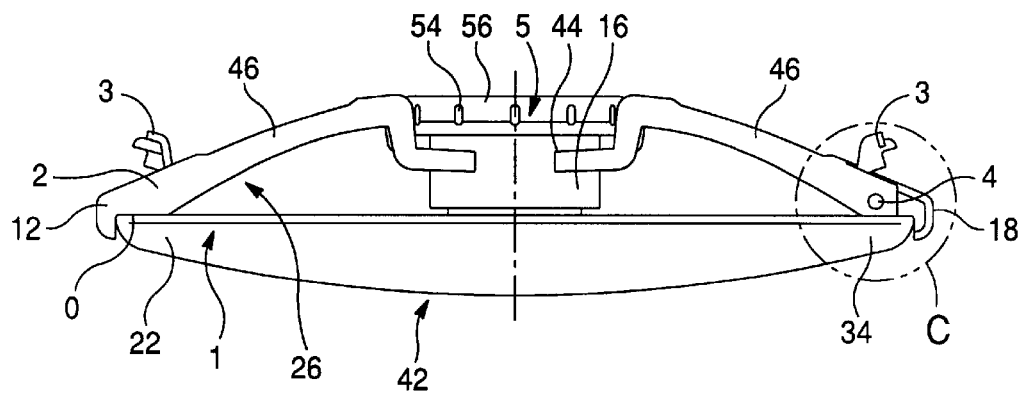
FIG. 4 is a sideview of the cover of FIG. 1 but with opened latch.

The illustrative embodiment of the invention of the dish-shaped cover 1 for cooking/frying vessels or the like shown in the Figures illustrates by means of various views and sections a cover 1 comprising at least one aperture 12 in a central zone 10. At least one aperture 12 is configured centrally and assumes a circular cross-section. Obviously two or more apertures also may be present in the central zone 10. A hood 7 essentially acting like a roof or the like spans the at least one aperture 12 at the top side 14 of the cover 1 and is held in place by a fastening system 16.

The fastening system 16 is a grip 2 spanning the cover 1 like a bail. The terminal segments 18 of the grip 2 are detachably fastened to the cover's rim 20.

The cover rim 20 consists of an upwardly bent annular wall 22 which in this embodiment comprises two outwardly pointing catches 24, brackets, cams or the like. Depending on the number of arms 46 of the grip 2, more than two catches 24 may of course be present at the annular wall 22.

The terminal segments 18 of the grip 2 are fitted at the underside 26 with a groove- or gutter-shaped seat 28 entered by the annular wall 22 when the grip 2 is deposited on the cover 1. Moreover the terminal segments 18 of the grip 2 are fitted at the underside 26 with substantially U-shaped, hook-shaped or the like inward crimps 30. These crimps 30 pass under or around the catches 24, brackets, cams or the like of the annular wall 22 provided that the grip 2 be fastened to the cover 1.

At least one, preferably each of the crimps 30 comprises a stop 34 at the first side rim 32 of the grip 2 and in particular in the form of an appropriate crosswall. A latch 3 each rests in pivoting, tipping manner or the like at least at one, preferably however at several or at all segments 18 of the grip 2 to secure the grip 2 to the cover rim 20 against accidental detachment. For that purpose the latch 3 is mounted on a second side rim 36 of the grip 2 and comprises a stop 38, in particular a tab, catch, bracket or the like which when in the latched position will rest on the side of the catch 24 of the rim 20 of the cover 2.

The latch 3 rests in pivotable, tipping or similar manner at the terminal segment 18 of the grip 2 by means of a bolt 4 or the like which is mounted in particular transversely to the length of the grip 2. When in the closed position, the latch 3 is substantially fully received in a matching clearance 40 of the terminal segment 18. Moreover the latch 3 when in the closed position can be locked in position by means of a detent catch or the like and be secured against accidental displacement into the open position.

The top side 14 of the cover 1 is substantially concave. The cover 1 is made of glass, ceramic or the like, the underside 42 of the cover 1 where appropriate being roughened by sand jet, printing, knurling or decoration.

The grip 2 comprises a center segment 44 to mount and/or affix the hood 7, several arms 46, two in this embodiment, but where appropriate also three or more, running toward the cover rim 20. The arms 46 of the grip 2 of the preferred embodiment run diametrically outward, though in the case of more than two arms, equal angles may be subtended between adjacent arms 46. For three arms such an angle is approximately 120°, and for four arms, approximately 90°. In particular for the purpose of continuously lowering/raising the hood 7 relative to the cover 1, the grip 2 comprises an adjustment means 5. To implement this design, the center segment 44 of the grip 2 comprises a borehole 48 with an inside thread 50 to rotatably guide in it a setting device 52, the hood 7 being affixed to this borehole 48. The setting device 52 per se is pot-shaped or fitted with a borehole and may comprise transverse strips 54 or the like which are mounted at a rim 56 of the setting device 52. A thermometer 6 is received in a clearance or borehole 58 of the setting device 52 to display the frying/cooking temperature in the frying/cooking vessel.

The setting device 52 and the hood 7 are connected to each other by a detachable fastener 8, in particular a screw, a bolt or the like. The fastener 8 is made of a thermally conducting material such as iron, aluminum or steel and is connected in thermally conducting manner with the thermometer 6.

The hood 7 assumes the shape of a disk 60 or the like and comprises a bead at its rim. The surface 62 of the hood 7 is convex. At least the outer edge 64 of the rim 7 is resilient or consists of a resilient material. The hood 7 also comprises a central and substantially circular protrusion 66 entering a seat 68 of the setting element 52.

Figure 5:
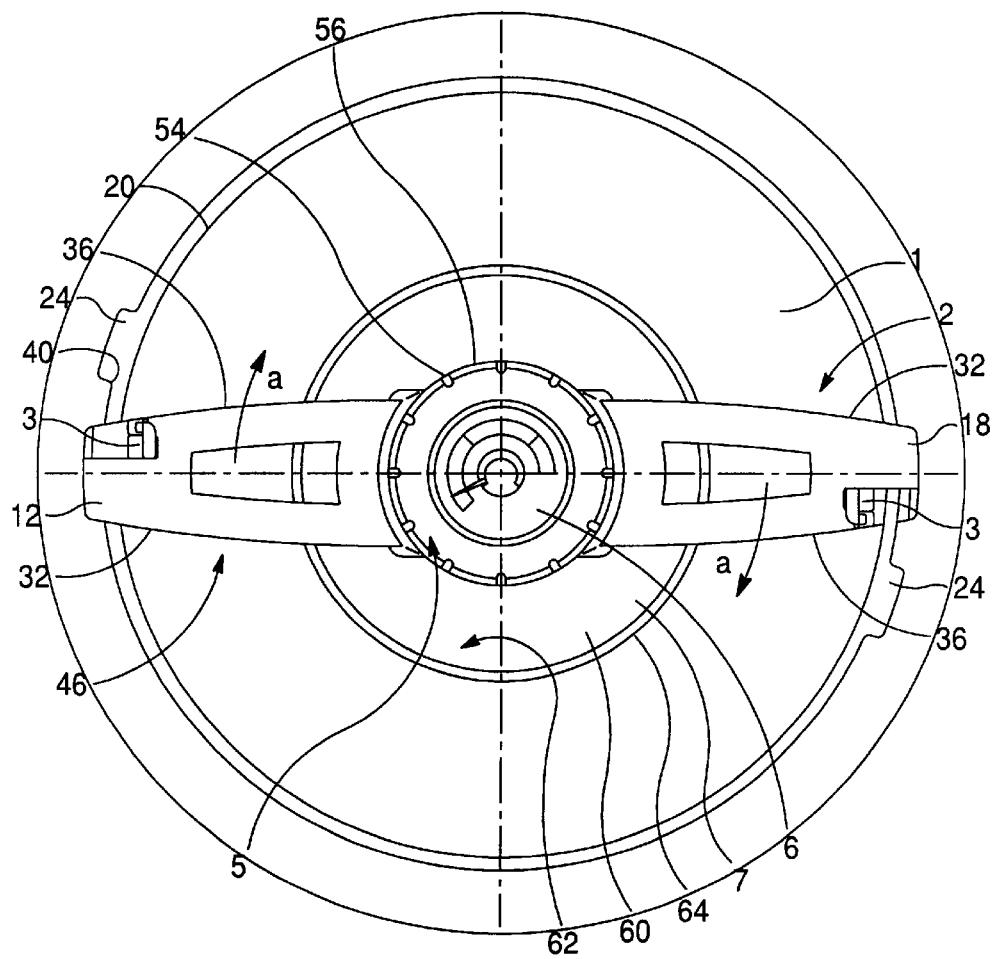
FIG. 5 is a topview of the cover of FIG. 4.
Figure 6:
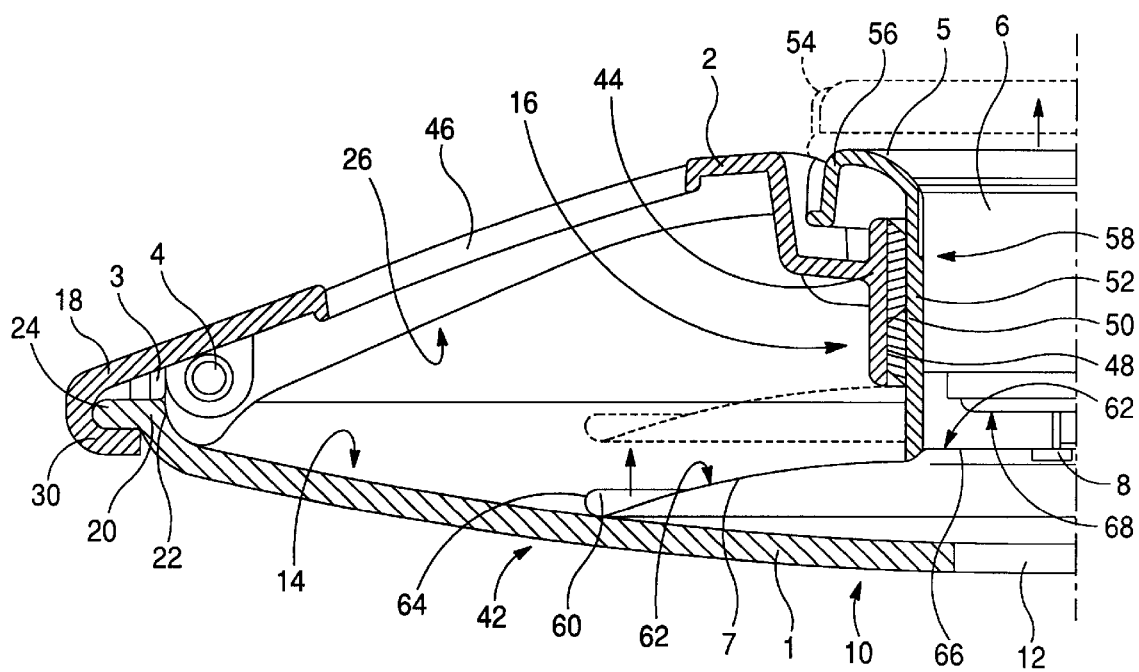
FIG. 6 is a cross-section of the cover along line A—A of FIG. 3.
Figure 7:
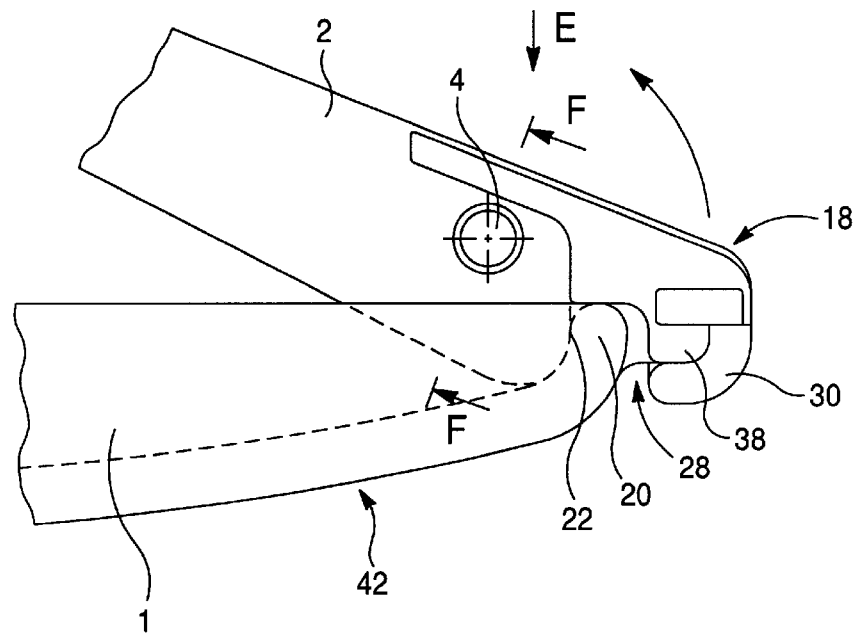
FIG. 7 is a detail view of the segment B of FIG. 2.
Figure 8:
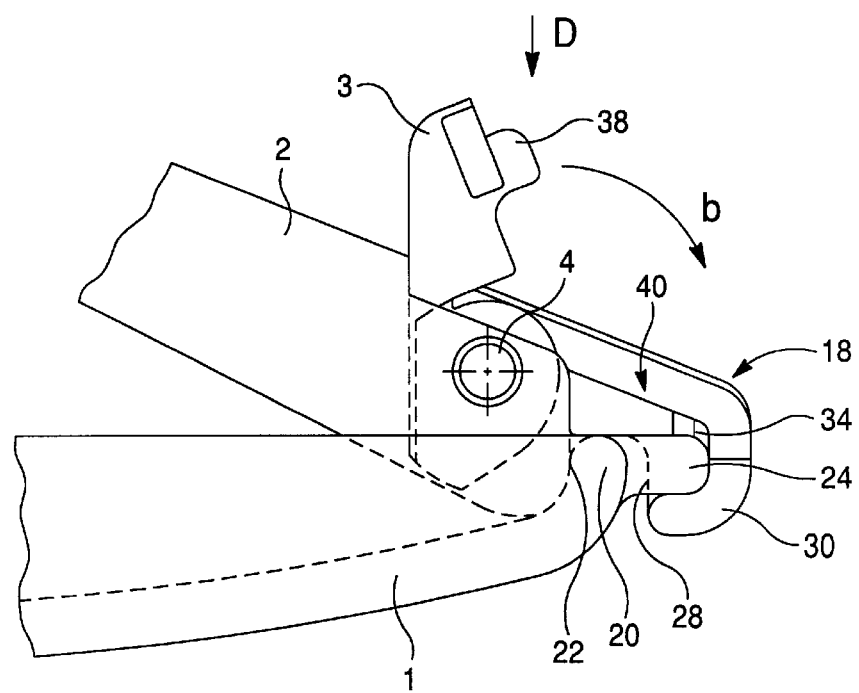
FIG. 8 is a detail view of the segment C of FIG. 4.
Figure 9:
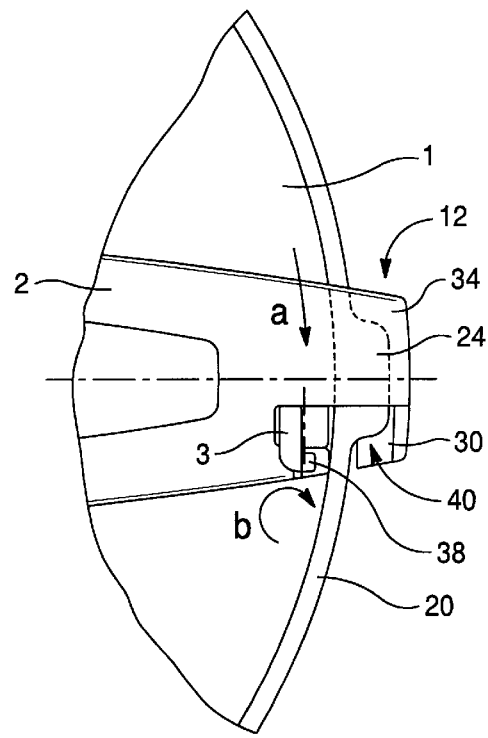
FIG. 9 is a topview of the detail view of FIG. 8 in the direction D.
Figure 10:
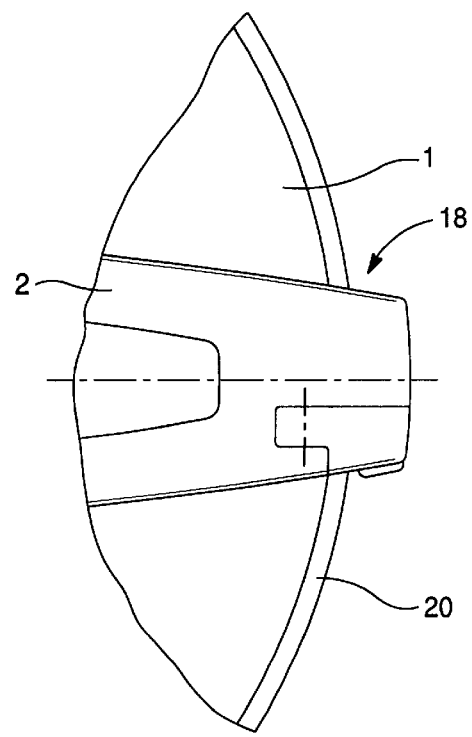
FIG. 10 is a topview of the detail view of FIG. 7 in the direction E.

As shown in FIG. 5, in order to be fastened to the cover 1, the grip 2 is deposited laterally adjacent to the catches 24 of the cover 1, the annular wall 22 of the cover 1 dipping into the scats 28 of the terminal segments 18 of the grip 2, and as a result the grip is rotatably guided on the annular wall 22 of the cover 1. To set up connection between the grip 2 and the cover 1, the grip 2 is rotated in the direction of the arrow A of FIG. 5 and consequently the crimps 30 will seize underneath or around the catches. The rotation of the grip 2 relative to the cover 1 when setting up the connection is limited by the stop 34 at the crimps 30. To preclude accidental detachment of the grip 2 from the cover 1, the latches 3 are moved into the closed position, a stop 38 in the latches 3 coming laterally to rest against the catch 24 of the cover 2. When the latches 3 are in this closed position, there cannot be relative rotation between the grip 2 and the cover.

Detaching the grip 2 from the cover 1, for instance for cleaning, is carried out in the reverse order.

Using the adjustment means 5, the hood 7 can be continuously lowered and raised relative to the top side 14 of the cover 1. The setting device 52 per se comprises a thermometer 6 mounted in a clearance 58 or a borehole and thermally coupled by a fastener 8 to the inside of the food-preparing vessel. The fastener 8 also affixes the hood 7 to the setting device 52.

Figure 12:
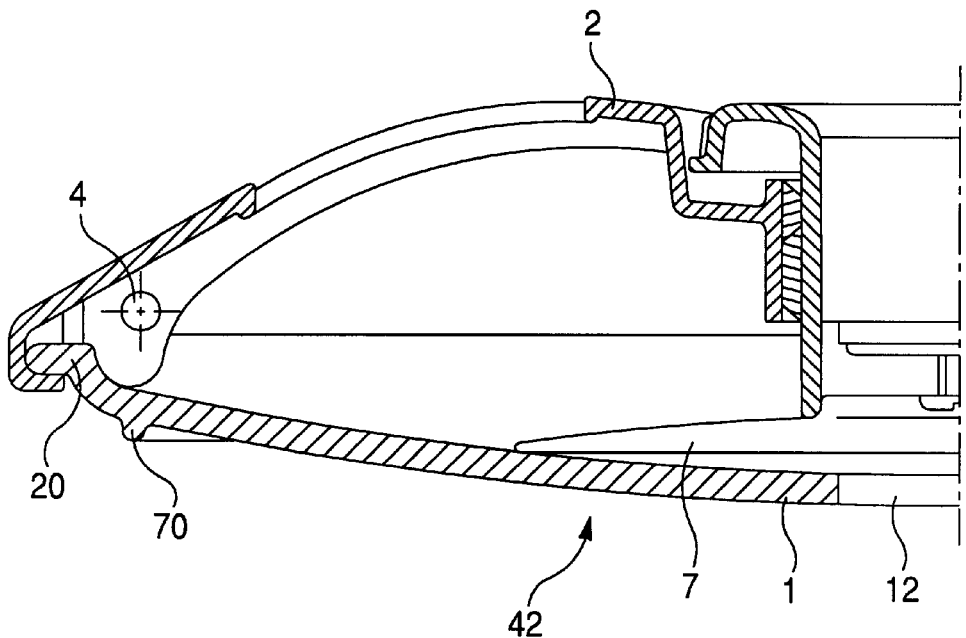
FIG. 12 is a partly sectional view of another embodiment of the invention fitted with an annular bead at the underside of the cover.
Figure 13:
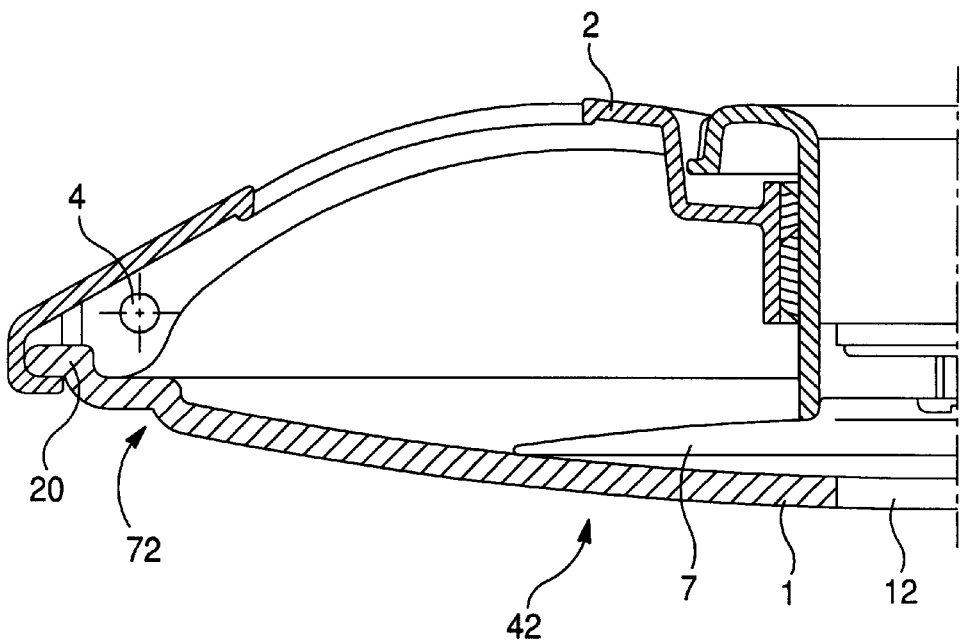
FIG. 13 is a partly sectional view of another embodiment of the invention with an annular peripheral offset at the underside of the cover.
Figure 14:
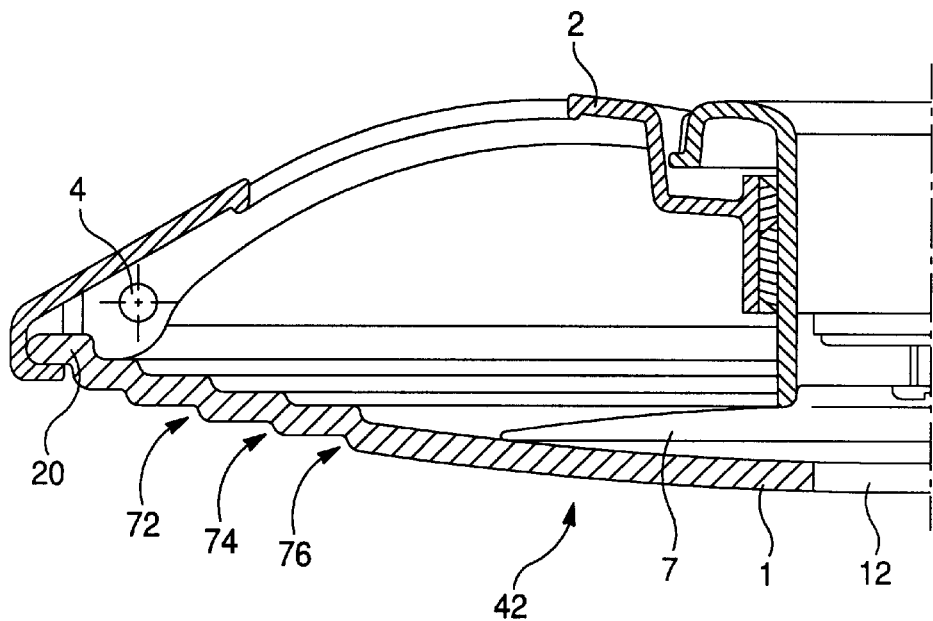
FIG. 14 is a partly sectional view of a further embodiment of the invention with a plurality of annular, peripheral offsets at the underside of the cover.

FIGS. 12, 13 and 14 show further modifications and special embodiments of the cover of the invention, an annular bead 70 or an annular circumferential step 72 or offset being present at the underside 42 of the cover 1 or also several such beads or steps 72, 74 and 76 being provided. These annular beads or steps or offsets are configured in such manner on the underside 42 of the cover 1, ie they are of such diameter, that they serve as rests on the rim of standardized-size or -diameter cooking vessels.

Figure 16:
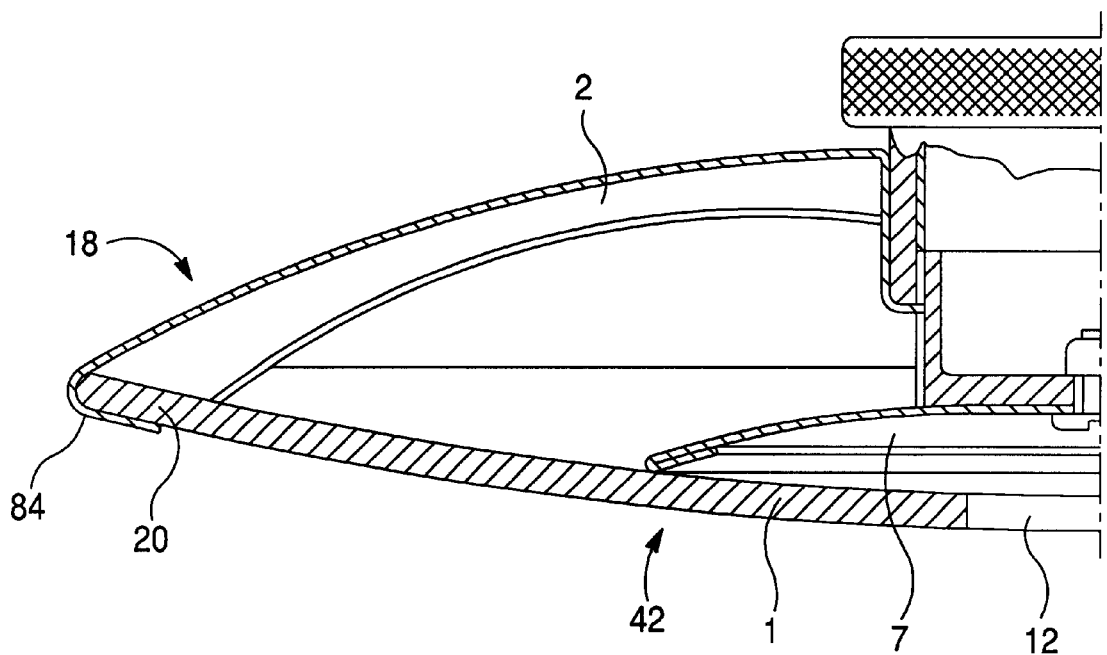
FIG. 16 is a partly sectional view of a further embodiment of the invention wherein the sheetmetal grip is crimped around the rim of the cover.
Figure 11:
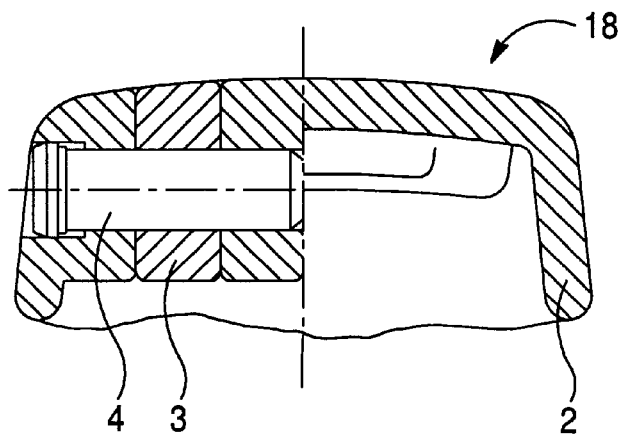
FIG. 11 is a section along line F—F of FIG. 7.
Figure 15:
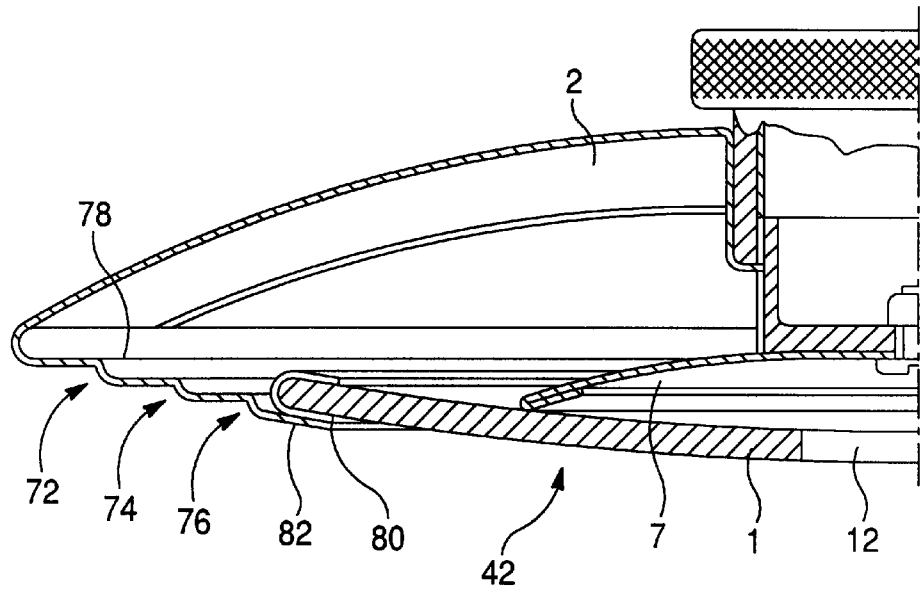
FIG. 15 is a partly sectional view of another embodiment of the invention wherein the cover consists of a glass base and an outer ring.

In the embodiment of FIGS. 15 and 16, the cover 1 consists of a glass base and comprises a central aperture 12, the grip 2 being made of sheetmetal or the like. Whereas in the embodiment of FIG. 16 the terminal segments 18 of the grip 2 are affixed by crimps 84 to the cover rim 20, the glass base in the embodiment of FIG. 15 is circumscribed by an outer ring 78. In both cases cams and the like otherwise provided can be eliminated at the outer rim of the glass base. Furthermore a rim 20 illustratively drawn upwards can be eliminated from the embodiment of FIG. 15 because this rim herein is formed by the outer ring 78.

The embodiment of FIG. 15 furthermore provides that the glass base comprise a preferably sheetmetal annular shoe 82 or a similar sectional shape, where called for with an integrated bracket at the rim vicinity of the glass base, the sectional shape being connected by a connection means 80, for instance a screw, rivet, bonding or soldering to the outer ring 78. Obviously a comparable connection, between the glass base outer rim and a segment of the grip 2 in the vicinity of the rim is also feasible.

Figure 18:
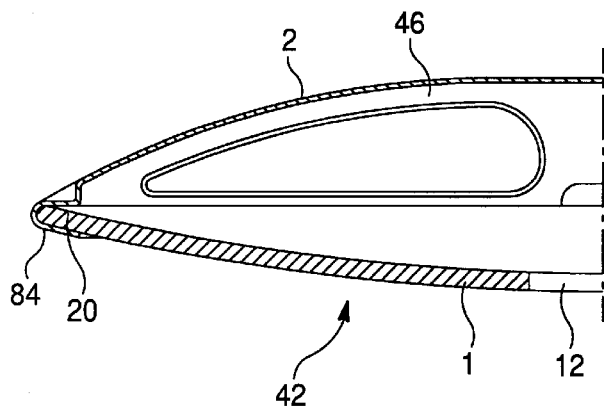
FIG. 18 is a partly sectional view of the illustrative embodiment of FIG. 17 along the line A—A.
Figure 17:
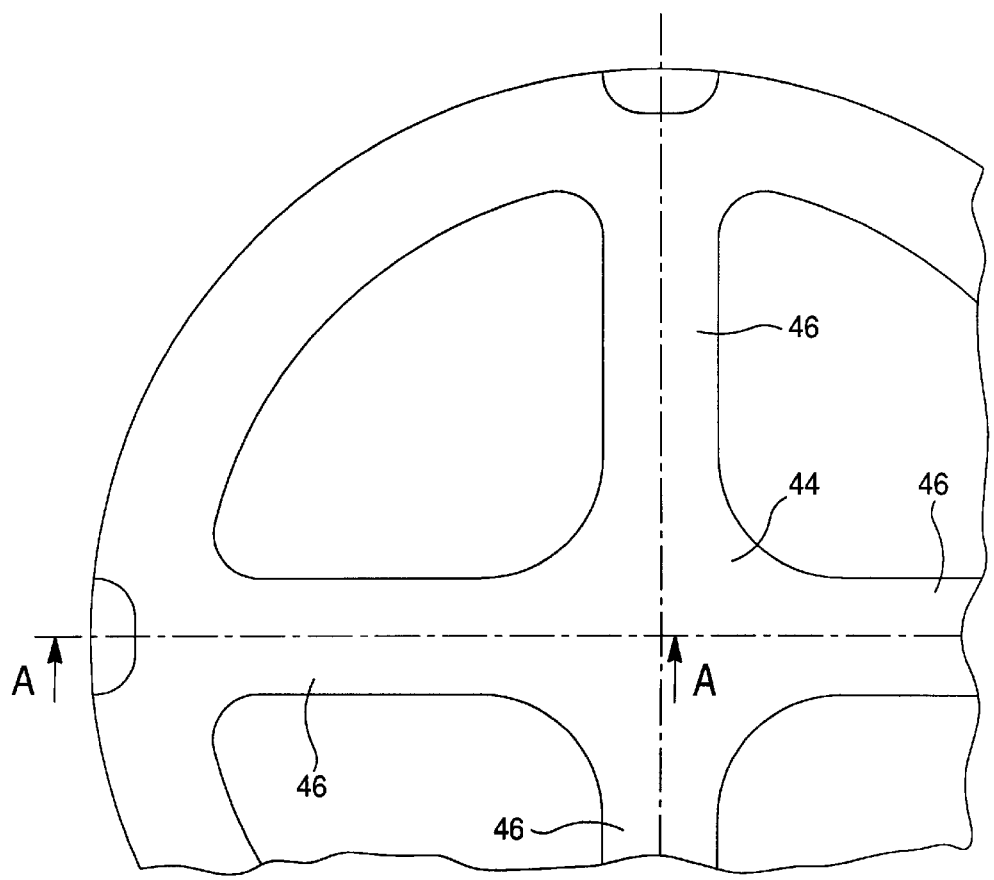
FIG. 17 is a topview of another embodiment of the invention comprising a four-arm grip.

The embodiment of FIGS. 17, 18 is characterized in that the grip 2 comprises substantially mutually orthogonal arms 46 running from a center zone 44 radially outward to the cover rim 20 and preferably being affixed by crimps 84 to the cover 1.

Figure 20:
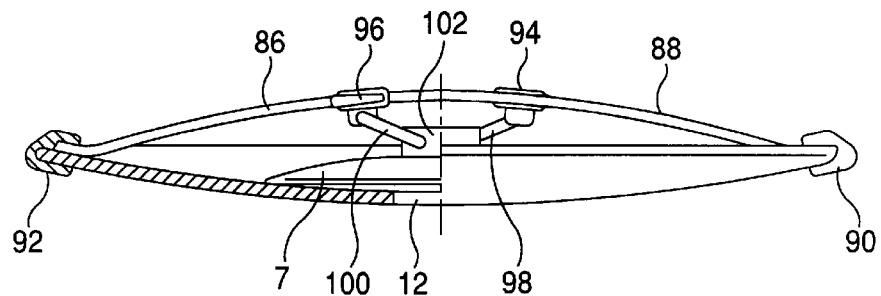
FIG. 20 is a partly sectional sideview of the embodiment of FIG. 19.
Figure 19:
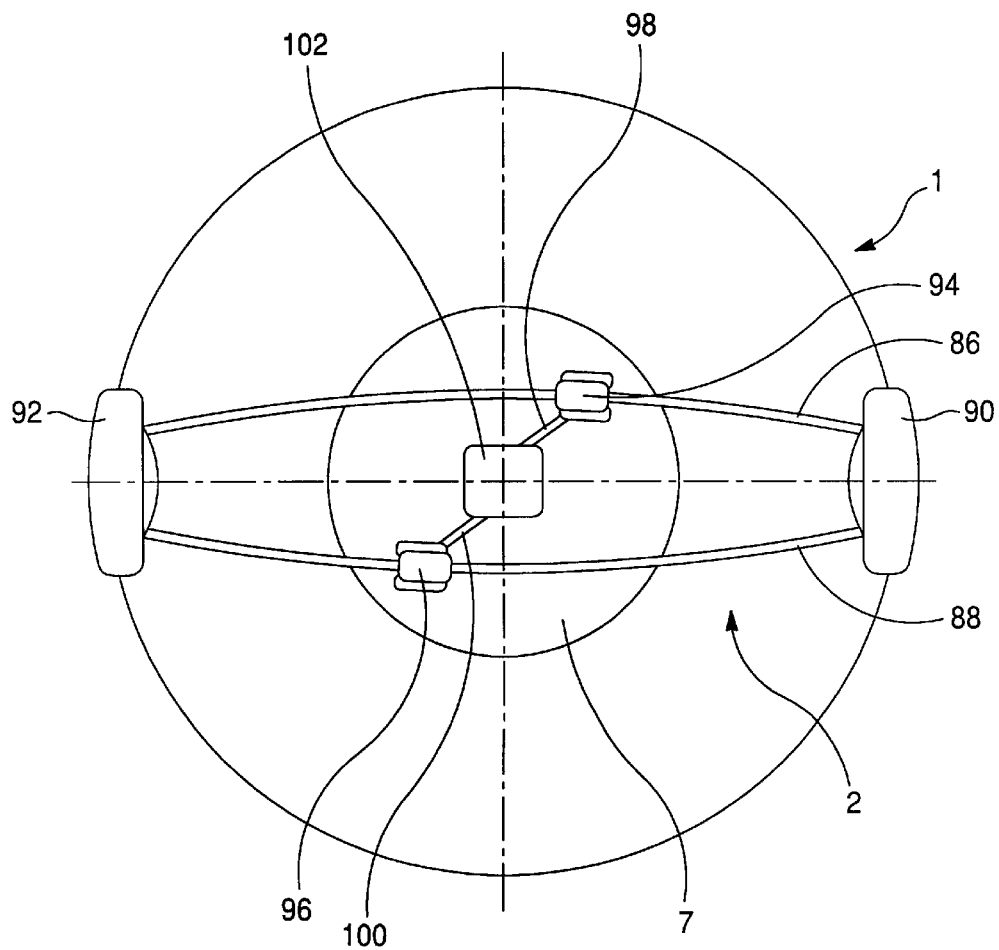
FIG. 19 is a topview of another embodiment of the cover comprising a modified adjustment means for the hood.

In another preferred embodiment of the invention, the grip 2 consists of two adjacent bails 86, 88 radially spanning the cover 1 as shown in FIGS. 19 and 20. The end segments of the adjacent bails 86, 88 each are held in an affixation means 90, 92 enclosing the cover rim in the manner of a U channel and being fastened to the cover I especially in clamping or similar manner. Manifestly such affixation means 90, 92 to the cover 1 also can be in the form of bonding etc.

A slider 94, 96 is displaceably guided on each bail 86, 88 and a linkage to raise/lower the hood 7 is mounted between the sliders 94, 96 and the hood 7. The linkage always comprises a linkage arm 98, 100 connected to the slider 94, 96 and a bearing 102 of the hood 7. The sliders 94, 96 can be fastened in clamping, detenting or similar manner to the bails 86, 88. Therefore, by displacing the sliders 96, 98 along the bails 86, 88, the hood 7 can be lifted from or lowered onto the aperture 12. This alternate design to drive the hood 7 is unusually economical compared with the above embodiments.

What is claimed is:

1. A dish-shaped cover (1) for a cooking vessel comprising at least one aperture (12) at a central zone (10), a hood (7) spanning at least one aperture (12) being affixed to a top side (14) of the cover (1) by an affixation means (16), wherein the affixation means (16) is a grip (2) spanning the cover (1) in a manner of a bail, and terminal segments (18) of the grip (2) are fastened to a rim (20) of the cover.

2. Cover as claimed in claim 1, wherein the grip (2) is detachably fastened to the cover rim (20).

3. Cover as claimed in claim 1, wherein the cover rim (20) comprises an upwardly bent annular wall (22) including radially outward pointing catches (24).

4. Cover as claimed in claim 1, wherein the top side (14) of the cover (1) is substantially concave.

5. Cover as claimed in claim 1, wherein the hood (7) is formed in the shape of a disk (60) and comprises a pointing bead adjacent a rim side.

6. Cover as claimed in claim 1, wherein the surface of the hood (7) is convex.

7. Cover as claimed in claim 1, wherein at least an outer rim (64) of the hood (7) is resilient.

8. Cover as claimed in claim 1, wherein the cover (1) is composed of a glass base, the glass base being enclosed by a sheetmetal outer ring (78) and the grip (2) being integrally connected to the outer ring (78).

9. Cover as claimed in claim 1, wherein the grip (2) comprises four substantially mutually orthogonal arms (46) extending from a central segment (44) radially outward to the cover rim (20) and being affixed by end-side crimps (84) to the cover (1).

10. Cover as claimed in claim 1 wherein the grip (2) comprises a central zone (44) to mount the hood (7), and a plurality of arms (46) extend from said central zone (44) toward the rim (20).

11. Cover as claimed in claim 10, wherein the arms (46) of the grip (2) are mounted pointing diametrically outward to subtend substantially at equal angles between adjacent arms (46).

12. Cover as claimed in claim 1, wherein the cover (1) is composed of a glass base with a central aperture (12) and the grip (2) is made of sheetmetal, the terminal segments of the grip (2) being affixed by crimps (84) to the cover rim (20).

13. Cover as claimed in claim 12, wherein at its rim side the glass base comprises a sheetmetal annular shoe (82) being connected by a fastening means (80) to the outer ring (78).

14. Cover as claimed in claim 1, wherein the grip (2) is composed of two adjacent bails (86, 88) radially spanning the cover (1).

15. Cover as claimed in claim 14, wherein an end-side segment of each of the bails (86, 88) each are held in a fastening system (90, 92) enclosing the cover rim (20) defined by a U-channel affixed to the cover (1).

16. Cover as claimed in claim 1, wherein the cover (1) is made of one of glass, ceramic, plastic and metal, and an underside (42) of the cover (1) is roughened.

17. Cover as claimed 16, wherein at least one concentric annular bead is mounted on an outer rim zone of the underside (42) of the cover (1).

18. Cover as claimed in claim 16, wherein at least one annular step (72, 74, 76), is mounted on an outer rim zone of the underside (42) of the cover (1).

19. Cover as claimed in claim 1, wherein at an underside (26) of the terminal segments (18) of the grip (2) is provided a groove-shaped seat defining an annular wall (22).

20. Cover as claimed in claim 19, wherein the terminal segments (18) of the grip (2) are fitted at the underside (26) with a substantially U-shaped inward pointing crimp (30) disposed under the catch (24).

21. Cover as claimed in claim 20, wherein a crimp (30) comprises a stop (34), at a first lateral edge (32) of the grip (2).

22. A dish-shaped cover (1) for a cooking vessel comprising at least one aperture (12) at a central zone (10), a hood (7) spanning at least one aperture (12) being affixed to a top side (14) of the cover (1) by an affixation means (16), wherein the affixation means (16) is a grip (2) spanning the cover (1) in a manner of a bail, and terminal segments (18) of the grip (2) are fastened to a rim (20) of the cover; and wherein a latch (3) is pivotally supported by at least one of the terminal segments (18) of the grip (2) and secures the grip (2) to the cover rim (20) against accidental detachment.

23. Cover as claimed in claim 22, wherein the latch (3) is mounted in a region of a second lateral edge (36) of the grip (2) and comprises a stop (38) resting against the catch (24) of the cover (1) when in a closed position.

24. Cover as claimed in either of claim 20, wherein the latch (3) is supported by a bolt (4) which is pivotally mounted transversely to a length of the grip in a region of the terminal segments of the grip (2).

25. Cover as claimed in claim 22, wherein when in a closed position the latch (3) is substantially wholly received in a matched recess (40) of at least one of the terminal segments (18).

26. Cover as claimed in claim 22 wherein when in a closed position the latch (3) can be locked by means of a detent catch.

27. A dish-shaped cover (1) for a cooking vessel comprising at least one aperture (12) at a central zone (10), a hood (7) spanning at least one aperture (12) being affixed to a top side (14) of the cover (1) by an affixation means (16), wherein the affixation means (16) is a grip (2) spanning the cover (1) in a manner of a bail, and terminal segments (18) of the grip (2) are fastened to a rim (20) of the cover; and the grip (2) comprises an adjusting means (5) to raise and lower the hood (7) relative the cover (1).

28. Cover as claimed in claim 27, wherein the grip (2) comprises a borehole (48) with an inside thread (50) in a center segment (44), and a setting device (52) is rotatably guided in the borehole (48) and is affixed to the hood (7).

29. Cover as claimed in claim 28, wherein the setting device (52) is pot-shaped and includes a second rim (56) fitted with cross strips (54).

30. Cover as claimed in claim 28, wherein the hood (7) comprises a substantially circular protrusion (66) entering a seat (68) of the setting device (52).

31. Cover as claimed in claim 28, claim 16, wherein a thermometer (6) is received in a clearance (58) of the setting device (52) to display a cooking temperature in the cooking vessel.

32. Cover as claimed in claim 31, wherein the setting device (52) and the hood (7) are connected to each other by a detachable fastener (8).

33. Cover as claimed in claim 32, wherein the fastener (8) is made of a thermally conducting material and is connected in a thermally conducting manner to the thermometer (6).

* * * * *